No. 762,561. PATENTED JUNE 14, 1904.
F. A. SEIBERLING & W. C. STEVENS.
MACHINE FOR MAKING OUTER CASINGS FOR DOUBLE TUBE TIRES.
APPLICATION FILED NOV. 28, 1903.
NO MODEL. 5 SHEETS—SHEET 2.

No. 762,561. PATENTED JUNE 14, 1904.
F. A. SEIBERLING & W. C. STEVENS.
MACHINE FOR MAKING OUTER CASINGS FOR DOUBLE TUBE TIRES.
APPLICATION FILED NOV. 28, 1903.
NO MODEL. 5 SHEETS—SHEET 3.

WITNESSES: INVENTORS:
F. A. Seiberling and
Wm. C. Stevens,
BY C. E. Humphrey
ATTORNEY No. 762,561. PATENTED JUNE 14, 1904.
F. A. SEIBERLING & W. C. STEVENS.
MACHINE FOR MAKING OUTER CASINGS FOR DOUBLE TUBE TIRES.
APPLICATION FILED NOV. 28, 1903.
NO MODEL. 5 SHEETS—SHEET 4.
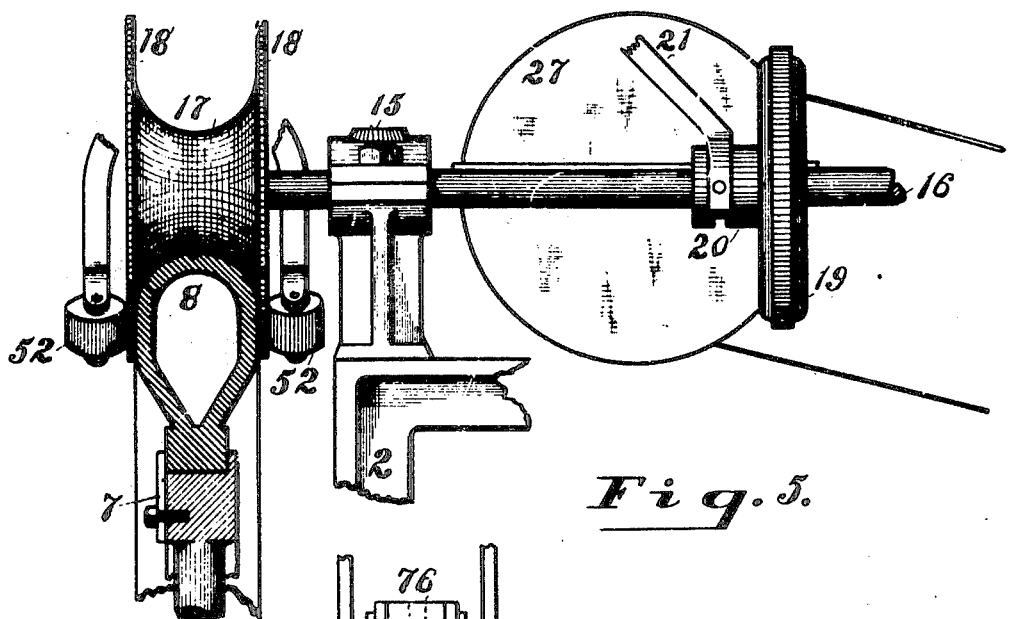
*Fig. 5.*
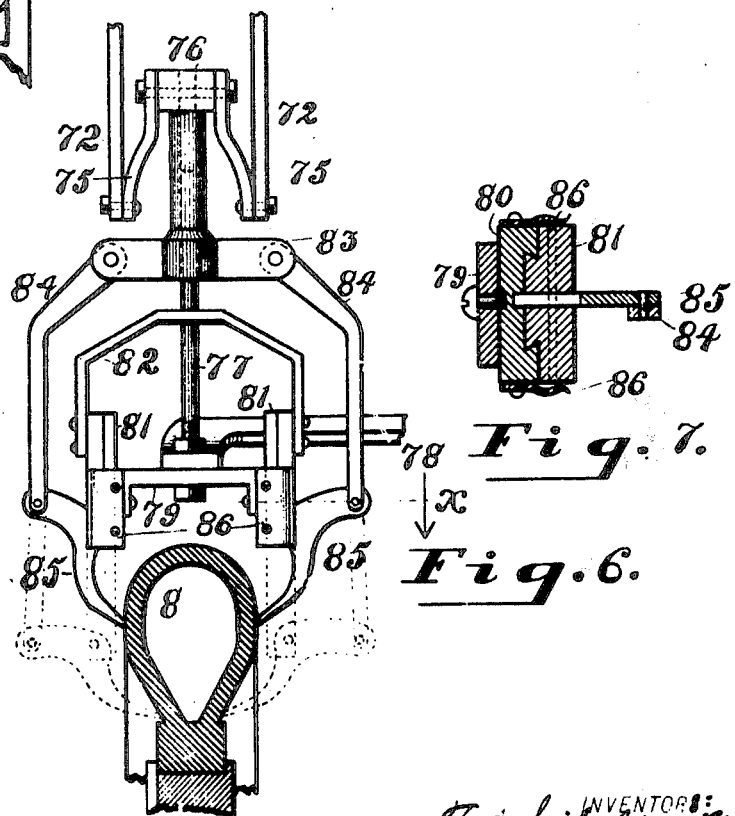
*Fig. 6.* *Fig. 7.*

No. 762,561. PATENTED JUNE 14, 1904.
F. A. SEIBERLING & W. C. STEVENS.
MACHINE FOR MAKING OUTER CASINGS FOR DOUBLE TUBE TIRES.
APPLICATION FILED NOV. 28, 1903.
NO MODEL. 5 SHEETS—SHEET 5.

Witnesses:
Maude Qwisler.
a R King

Inventors:
F. A. Seiberling and
Wm. C. Stevens,
By C. E. Humphrey.
Atty.

UNITED STATES PATENT OFFICE.

FRANK A. SEIBERLING AND WILLIAM C. STEVENS, OF AKRON, OHIO.

MACHINE FOR MAKING OUTER CASINGS FOR DOUBLE-TUBE TIRES.

SPECIFICATION forming part of Letters Patent No. 762,561, dated June 14, 1904.

Application filed November 28, 1903. Serial No. 182,987. (No model.)

*To all whom it may concern:*

Be it known that we, FRANK A. SEIBERLING and WILLIAM C. STEVENS, citizens of the United States, residing at Akron, in the county of Summit and State of Ohio, have invented a certain new and useful Improvement in Machines for Making Outer Casings for Double-Tube Tires, of which the following is a complete specification.

This invention relates to machines for producing the outer tubes or shells of endless pneumatic tires, and is especially adapted to manufacturing comparatively heavy shells, such as are used for automobiles and heavy work.

The objects of this invention are to produce a machine by which the outer shells of heavy double-tube pneumatic tires may be rapidly and efficiently manufactured and to provide this machine with simultaneous coacting mechanism by which the successive layers of fabric of which the outer shell is composed may be laid and placed one upon another with great speed and accuracy and wherein the customary wrinkles and other roughness incident to the manufacture of these shells by hand are eliminated.

It is further an object of this invention to provide the mechanism hereinbefore referred to with suitable controlling means whereby different sizes of outer shells may be manufactured with such rapidity and regularity as has been heretofore unattainable.

To the accomplishment of the aforesaid objects this invention consists in the peculiar and novel construction, arrangement, and combination of the various parts hereinafter described, reference being had to the accompanying drawings, forming a part hereof.

Figure 1:
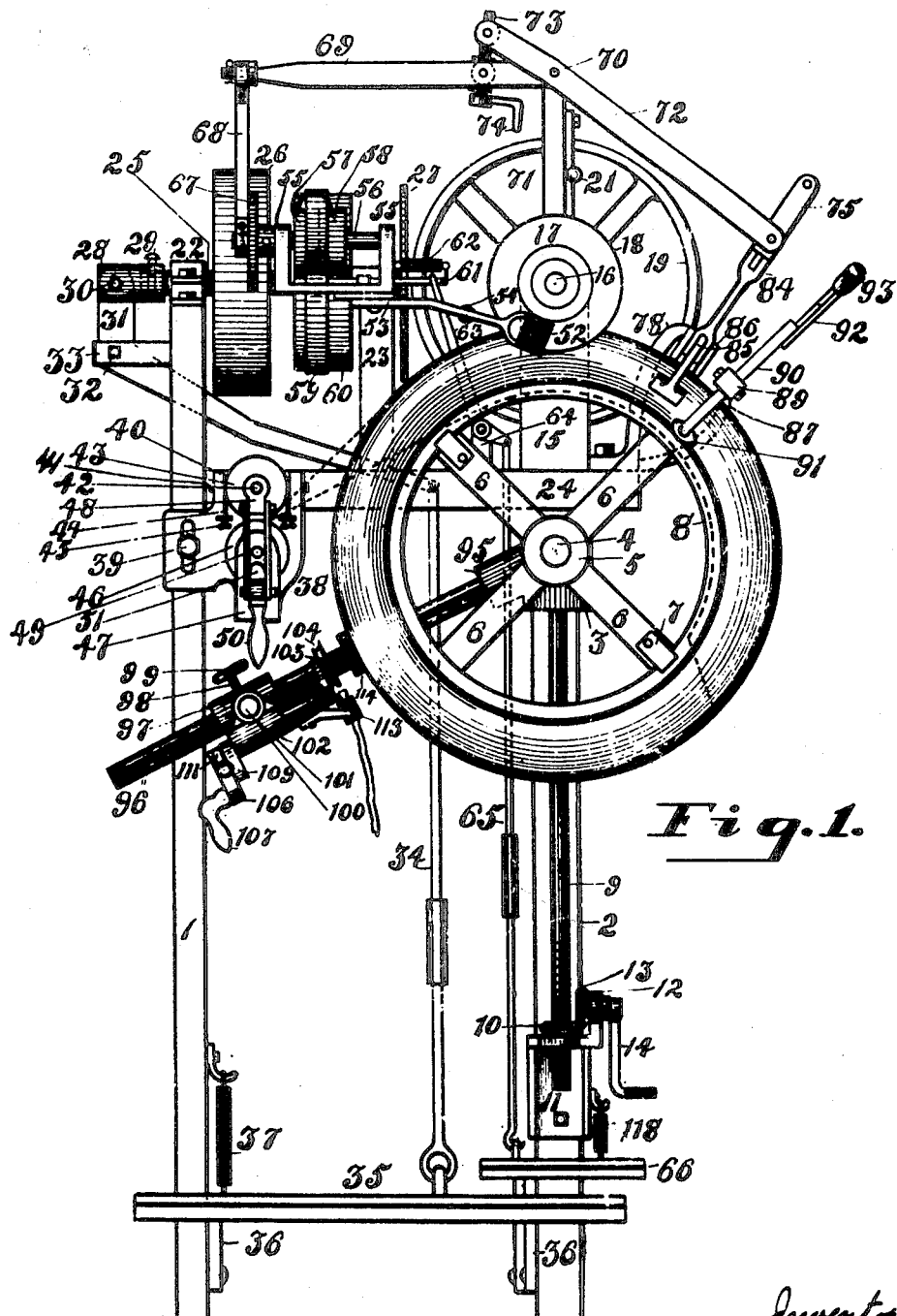
Figure 2:
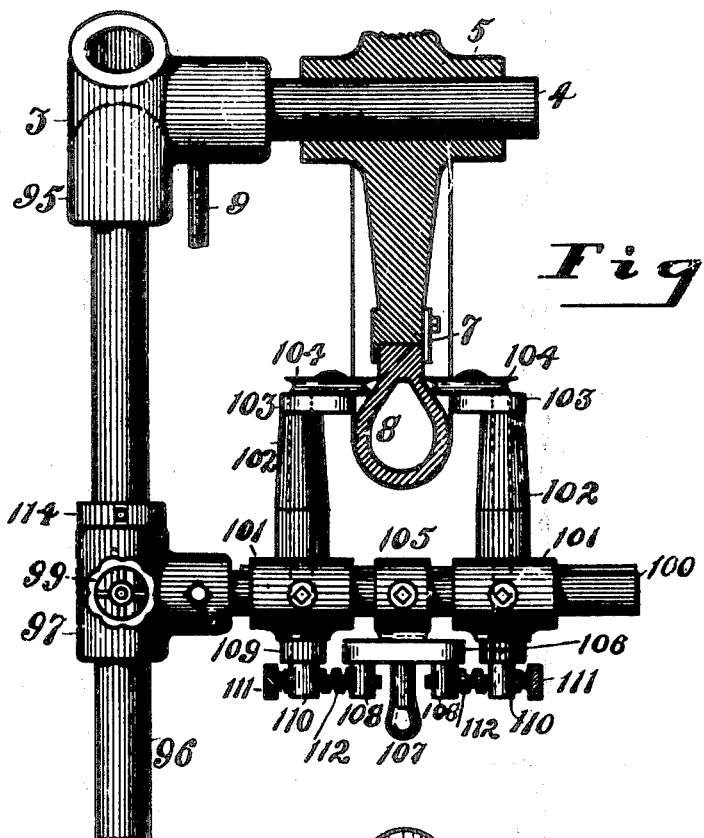
Figure 3:
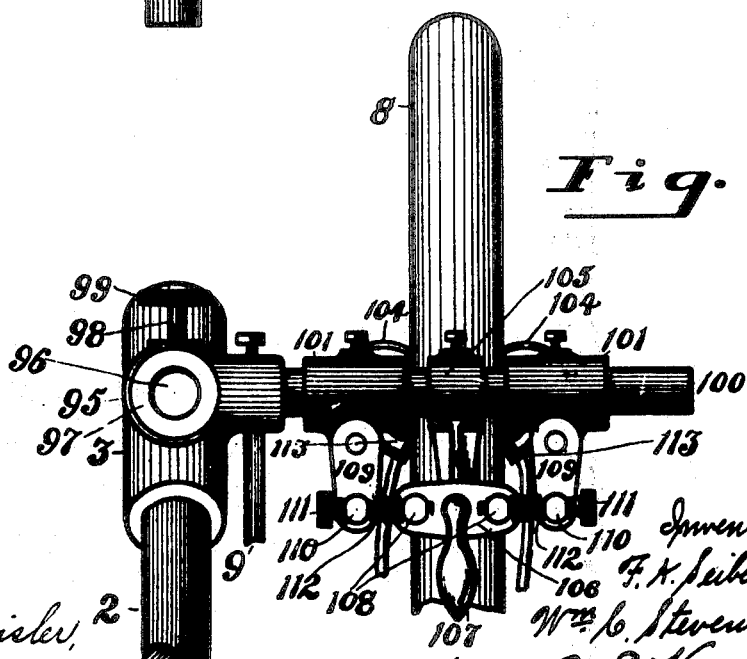
Figure 4:
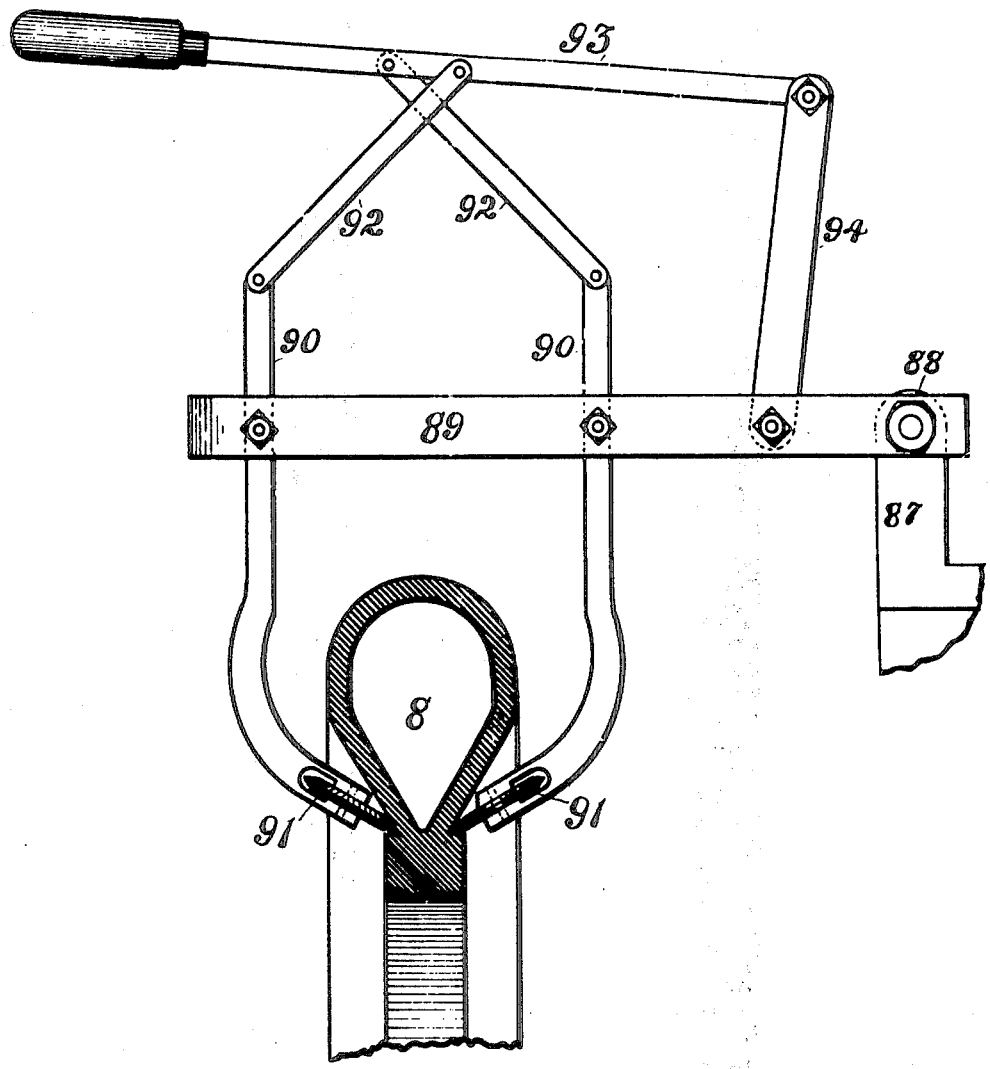

In the accompanying drawings, in which similar reference-numerals indicate like parts in the different figures, Figure 1 is a front elevation of the entire machine; Fig. 2, a plan view, enlarged, of the means whereby the beading is placed on the tire; Fig. 3, an end view of the mechanism shown in Fig. 2. Fig. 4 is an enlarged view of a creasing device used in placing fabric in position; Fig. 5, a view showing the means by which power is communicated to the core on which the shell is built up; Fig. 6, a detail of a reciprocating or smoothing device for smoothing the wrinkles out along the sides of the shell while being constructed; Fig. 7, a section at the line *x* of Fig. 6; and Fig. 8, a sectional view of the outer shell of a pneumatic tire, showing one of the forms of tire which this machine is capable of manufacturing.

In the drawings, 1 2 are the upright sides of a frame on which the mechanism hereinafter to be described is mounted. On the upright 2, which may be round or angular, as preferred, is a carriage 3, from which projects at right angles a shaft 4, on which is a hub 5, capable of ready revolution on the shaft 4. From this hub 5 project spokes 6, a portion of which are provided with clips 7 for a purpose to be stated. The outer ends of all these spokes are provided with a flange on one side which serves to hold the inner side of a circular mandrel or core on which the outer shell of the pneumatic tire is built up. This core is preferably hollow for lightness and has the same exterior and conformation that it is desired to impart to the interior of the finished shell. The inner or base portion of this core 8 is held on the ends of the spokes 6 on one side by flanges referred to and on the other side by the clips 7, which are capable of being readily removed when desired.

From the lower end of the carriage 3 depends a threaded rotatable shaft 9, the lower end of which passes through the central portion of a threaded miter-gear 10, which serves as a nut for said shaft and is supported by resting on a bracket 11, bolted to the upright 2. This bracket 11 has also an upright arm 12, through which passes a shaft bearing at one end a miter-gear 10 and at its opposite end a crank-arm 14, by which the rotation of both miters and the ascent and descent of the carriage 3 is attained.

The revolution of the core 8 on the shaft 4 is effected by the following mechanism: Above the shaft 4 and parallel therewith and mounted in suitable brackets 15 on the frame of the machine is a shaft 16. On that part of the shaft 16 immediately above the core 8 is a spool or roller 17, the central portion of which is concave and made of some suitable substance, such as vulcanized rubber covered with canvas, and the sides or ends of this spool 17 are composed of disks of heavy sole-leather 18.

On the rear portion of the shaft 16 and capable of longitudinal motion thereon is a friction-wheel 19 provided with a hub 20, both of which, together with the shaft 16, being splined to receive a key to compel the simultaneous revolution of said friction-wheel 19 with said shaft 16. A lever 21 is used to change the longitudinal position of this friction-wheel 19 on the shaft 16. It is obvious from the foregoing description that if the elevating-screw 9 is operated to raise the carriage 3 sufficiently to cause a snug engagement between the roller 17 and the core 18 the revolution of the friction-wheel 19 will rotate the core 8.

In order to rotate the friction-wheel 19, the following mechanism is employed: At right angles to the shaft 16 and mounted in brackets 22 on the frame 1 and on a bracket 23, mounted on a cross-bar 24, extending between the uprights 1 and 2, is a shaft 25, bearing a pulley 26, which is designed to receive power from a belt driven by any suitable or preferred source, the nature of which it is not essential to give in this description.

On the end of the shaft 25 adjacent to the friction-wheel 19 is a flat friction-disk 27, arranged to revolve with the shaft 25 and to be forced against and withdrawn from engagement with the friction-wheel 19 and to thereby cause the rotation of the shaft 16.

The shaft 25 is capable of longitudinal movement in its bearings and is actuated toward and away from the shaft 16 by the following means:

On the outer end of the shaft 25 is a cap 28, arranged to slip over the end of the shaft 25 and provided with a set-screw 29, arranged to enter a groove in the shaft 25 near its end, and thereby be retained thereon. In the opposite end of the cap 28 is pivoted, by means of a bolt 30, one end of a bell-crank lever 31, arranged to fulcrum on a bolt 32, passing through a bracket 33, attached to the upright 1. The lower end of this bell-crank is inwardly turned and is attached to a longitudinally-extensible rod 34, to the lower end of which is attached a pedal 25, mounted on pivoted arms 86 and normally kept upward by a spring 37.

From the foregoing description it will be seen that if the pedal 35 is depressed the shaft 25 will be inwardly moved, causing the engagement of the friction-disk 27 and the friction-wheel 19.

In order to impart a desired tension or stretch to the rubber-saturated fabric which is to compose the main portion of the shell or outer tube of the pneumatic tire, we provide the following mechanism: On the upright 1 is a bracket 38, held in place by a bolt 39, passing through a slot in the bracket to permit the vertical adjustment thereof. The rear upper portion of this bracket is bifurcated, leaving two upwardly-extending arms 40, across which extends a bolt 41, on which is pivoted one end of a shaft 42, bearing a loose roller 43. Over the rear portion of this roller passes a friction-band 44, capable of being tightened to a desired degree by thumb-nuts 45, so that a desired amount of resistance to its rotation may be imparted to this roller. Immediately below this roller 43 is a similar roller 46, but the shaft of which is rigid and is mounted between the back face of the bracket and an upwardly-turned portion 47, between which the roller rotates. On the front end of the shaft 42, bearing the roller 43, is a boss 48, on either side of the lower ends of which are straps 49, which have mounted between their lower ends a handle 50, having a cam-shaped head arranged to engage a boss 51 on the upright portion 47, the boss 51 being provided on its under surface with a suitable configuration to fit the cam-head of the handle 50.

The object of this arrangement is this. When it is desired to feed fabric to the core, the cam-handle 50 is released from engagement with the boss 51 and the upper roller 43 tilted upward on its pivot 41, permitting the insertion of a piece of fabric between the two rollers. Then the upper roller is lowered and compressed tightly against the lower roller by means of the mechanism just described. Sufficient pressure is then placed on the upper roller by means of the friction-band 44 to give a desired amount of resistance to the rotation of the rollers and the passage of fabric therebetween. From between these rollers the fabric is carried upward onto the core and passes under the roller 17, which smooths its upper surface, and partly down the sides of the core, this last feature being attained by two rollers 52, mounted on yoke-arms 53, pivoted to the upper portion of the bracket 23 and drawn toward each other by an inwardly-contracting spring 54. These rollers 52 have their axes radial to the center of the roller 17 and are arranged to press on the outer sides of the roller 17, which, as has been heretofore described, are made of sole-leather. The combined action of the roller 17 and the side rollers 52 serves to smooth the fabric down over the upper portion of the core and to a considerable distance downward therefrom. The mechanism by which the tire is smoothed from this point to the end of its rounded portion is as follows, reference being had to Figs. 1, 6, and 7, and may be described primarily as a reciprocating pair of fingers which slide up and down along the sides of the fabric on the core and smooth out the wrinkles with such rapidity of motion as to cover all portions of the fabric on the sides of the core during its revolution. Mounted on one portion of the bracket 23 is a small housing consisting of a base and two uprights 55, mounted in which is a shaft 56, capable of rotating therein. In the central portion of this shaft between the uprights 55 is a loose and a tight pulley 57 and 58, over which passes a belt 59 from a pulley 60 on the shaft 25. The position of this belt with reference to the two pulleys 57 and 58 is determined by a belt-shifter 61, held normally in a position to retain the belt on the loose pulley 57 by a spring 62, which may be shifted by means of a bell-crank lever 63, pivoted on a bracket 64 on the cross-bar 24. To the opposite end of this bell-crank 63 is attached a longitudinally-extensible rod 65, to the lower end of which is attached a pedal 66, normally kept raised by a spring 118, so that by depressing the pedal 66 the bell-crank lever 63 will throw the belt-shifter 61 to one side and shift the belt from the pulley 57. On the outer end of the shaft 56 is a crank 67, to the wrist-pin of which is attached a connecting-rod 68, whose upper end is pivotally connected to a lever 69, pivoted on a bolt 70, passing through a post 71, rising from the housing 15, which sustains the shaft 16. This lever 69 is bifurcated except at the point where it passes through the eye of the connecting-rod 68. Also mounted on the bolt 70 is a lever 72, likewise bifurcated its entire length and having extending between its ends a shaft, (not shown but indicated,) which stands immediately above the lever 69. A similar shaft is mounted and pivoted between the sides of the lever 69, and an adjusting-screw 73 extends between these two shafts and is controlled at its lower end by a crank-arm 74, so that the angle between the levers 69 and 72 may be changed at will, and thus the extent of the rocking of the long end of the lever 72 may be accurately determined.

On the lower free rocking end of the bifurcated lever 70 is placed the mechanism by which the sides of the fabric are smoothed around the core, and the mechanism is best illustrated in Figs. 6 and 7. Between the ends of this lever 72 and attached thereto are short arms 75, which are fastened to opposite sides of a head-block 76, which is vertically perforated and arranged to slide upward and downwardly on a guide-rod 77, held firmly in position by a bent arm 78, bolted to any desired or preferred portion of the frame of the machine. On the upright guide-rod 77, below the place occupied by the supporting-arm 78, is a cross-bar 79, to the outer ends of which are fastened by screws or otherwise guides 80. These guides are provided on their outer faces with vertical dovetailed recesses into which fit vertically-reciprocating fulcrum-blocks 81, which are connected by an arch 82, extending between them and inclosing the guide-rod 77. At the lower end of the head-block 76 is a cross-bar 83, to the outer ends of which are pivoted bent levers 84, which depend therefrom and have their lower ends pivoted to the outer ends of shaping or smoothing fingers 85, the pivots of which are bolts in the fulcrum-blocks 81. The lower ends of these fingers 85 are nicely and smoothly rounded and are arranged to slide along the surface of the fabric and to compel the fabric to follow the contour of the core 8. On either side of the guide-blocks 80 are spring-plates 86, arranged to be retained and adjusted in place by screws and to press against the fulcrum-blocks 81 with a pressure to be determined by the work required of the fingers 85. The necessity for these spring-plates or friction-plates 86 is this, that as the head-block 76 rises and falls, carrying with it the cross-bar 83, bent levers 84, and fingers 85, the fulcrum-blocks, which bear the pivots for the fingers 85, would have a constant tendency to fall of their own weight, and obviously as rapidly as the fingers descend, and the fingers would exert no pressure on the fabric at their working ends; but by retarding the descent of the fulcrum-blocks 81 a considerable pressure is required on the outer ends of the fingers 85 to compel their descent, thereby forcing inward with considerably greater force the working or smoothing ends of these fingers. Experience has shown that these fingers work upward and downward with great rapidity, so much so as to cover every portion of the sides of the fabric and smooth out all wrinkles, both great and small, which exist or occur in the bending of the fabric around the core. After passing this smoothing device the fabric must then be tucked into a crease which exists near the lower end of the core and forced there with considerable pressure to cause it to adhere until it is desired to remove the finished shell from the core. This creasing of the fabric in the manufacture of tires is known to the trade as "stitching." The mechanism for stitching by forcing the fabric into this crease or depression is as follows and is shown in Figs. 1 and 4: From a suitable part of the frame of the machine extends a supporting-arm 87, the shape and configuration of which and its adjustment to the frame being of secondary consequence in the construction of this device. At its outer or free end it is provided with a bolt 88, which forms a pivot for a bifurcated arm 89, between the sides of which are pivoted two curved arms 90, the lower ends of which are inturned and are provided with sharp-edged rollers 91. At the upper ends of these arms 90 are attached links 92, arranged to cross each other and be pivotally fastened to a lever 93, provided at one end with a handle for the grasp of the operator and at the other end pivoted to a link 94, which in turn is pivoted to the bifurcated arm 89. This device is only used at intervals in the placing of the fabric on the core, and hence when not in use may be raised by simply raising the handle, which swings apart the lower ends of the arms 91, releasing them from engagement with the fabric, and the whole device swings upward on the pivot-bolt 88 out of the way of the other mechanism of the machine.

In the construction of outer shells for heavy pneumatic tires it is customary to use a beading as a basis for forming a barb or grasping projecting on the lower portions of the shell to permit the inturned or clenching edges of the metallic tire of the vehicle to hook into, and this beading usually is made in a continuous strip with a hard soft-rubber core. By this is meant a rubber of such hardness as to be nearly as hard as what is known as "hard rubber," but still to retain sufficient inherent elasticity and flexibility as to permit its being bent and curved without cracking or breaking. This core is then surrounded by one or more layers of rubber-saturated fabric and placed against the sides of the fabric on the core. It is then covered by repeated layers of fabric and the whole united during vulcanization. In order to place this beading upon the sides of the fabric, which we will suppose to have been already placed upon the core, the following mechanism is used: On the side of the carriage 3 which sustains the core is a boss 95, into which is inserted and held by any preferred means a shaft 96. (See Figs. 1, 2, and 3.) This shaft 96 is designed to form an angle with the upright 2 of about sixty-three degrees and should be radial to the center of the shaft 4. On this shaft 96 is a slidable carriage 97, splined thereto. The retention of the carriage 97 on the shaft 96 at a desired point is obtained by means of a screw 98, operated by a hand-wheel 99. Projecting at right angles to the shaft 96 from the carriage 97 is a splined shaft 100, on which are mounted hubs 101 of long sleeve-like bearings 102, through which extend shafts. (Not shown, but indicated by dotted lines.) On the front ends of these shafts, inclosed in the sleeves 102, are fastened eccentric heads 103, and mounted on these heads 103 eccentric to the center of the shafts in the sleeves 102 are rollers 104, having the configuration of the outside of the beading to be placed on the shell in its construction. Between the hub 101 on the shaft 100 is another hub 105, which has depending from its rear face an arm to the lower end of which is pivoted on a substantially horizontal pin an elongated rocking plate 106, to which is attached a handle 107, by which it is rocked. From the face of this rocking plate 106 project two rotatable pins 108, for a purpose to be described. On the rear ends of the shafts inclosed in the sleeves 102 are depending crank-arms 109, and each has projecting from its lower end rotatable pins 110. The pins 110 and 108 are connected by adjusting-screws 111, having on their outer ends milled heads by which they may be rotated. These adjusting-screws 111 pass freely through the pins 110 and mesh into the pins 108, so that by revolving them the relative positions of the two crank-arms 109 to each other may be determined, which also determines the position of the grooved rollers 104 with reference to the core 8. Surrounding the adjusting-screws 111 are springs 112 to keep the crank-arms 109 normally thrown apart. Depending from the under faces of the sleeves 102 are brackets 113, having perforated heads, through the perforation of which the beading to be affixed to the tire is fed, thereby accurately feeding it into position, and as this perforation is a close fit for the beading it serves to prevent it from dropping to the floor when the beading mechanism is removed from operative connection with the core. On each of the hubs 101 and 105 are set-screws by which their positions may be fixed when determined. On the shaft 96 I customarily place a collar 114, held in a desired position by a set-screw or other preferred means with a view to regulating the position of the carriage 97 definitely and quickly when desired. Of course it is obvious that for different sizes of tires the position of the collar 114 will be varied to meet the requirements of the case. The operation of this bead-placing mechanism is as follows: Assuming that sufficient fabric has been placed on the core and the shell is in a proper condition to receive the beading and the parts are in the position shown in Fig. 1, with strips of indefinite length of beading in the guides 113, the screw 98, retaining the carriage 97 in place, is released and the carriage pushed forward toward the core until it encounters the collar 114. In doing this it is necessary to swing apart the rollers 104, so that they will pass around the main cylindrical portion of the fabric-covered core. As soon as the carriage 97 encounters the sleeve 114 the screw 9 is tightened and the handle 107 thrown to the position shown in Fig. 3, thereby pressing the rollers against the sides of the fabric at the proper place where it is desired to place the beading. The beading is then pushed upward and placed between the rollers 104 and the fabric on the core and the pedal 35 depressed, throwing the friction-disk 27 against the friction-wheel 19, causing the revolution of the core, and as it it revolves the bead on both sides of the core is fed onto the fabric and compressed there by the force of the rollers 104 until a complete revolution of the core has taken place, at which time the beading is severed from the continuous strip, the ends of the beading are nicely matched, the handle 107 swung a quarter of a revolution, throwing the rollers 104 away from the core, the screw 98 released, and the carriage 97, with its accompanying mechanism, swung out of the way, after which the placing of fabric on the partially-constructed tire is continued.

Figure 8:
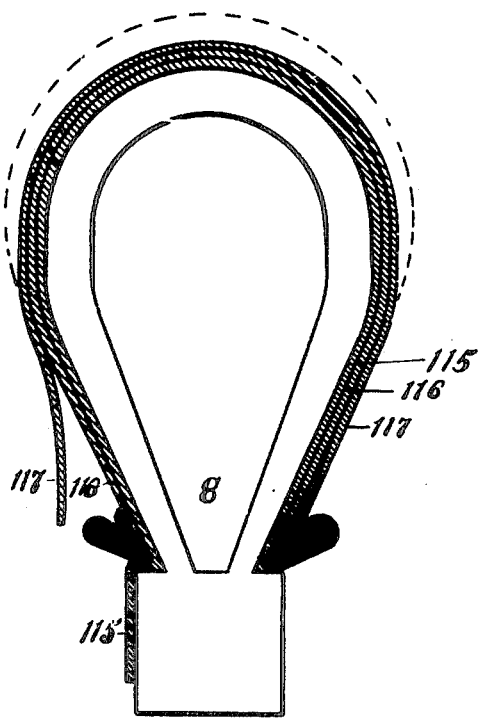

In Fig. 8 is shown one form of an outer shell which may be constructed on this machine, and the description of the process by which this shell is constructed will serve to illustrate the general construction of all tires which are to be made thereon. The first strip of fabric 15 is of sufficient width so that when fed onto the core the lower edges after being creased by the creasing-wheels 91 will lie on the flat portion of the core throughout the entire circuit thereof and of sufficient length to overlap a distance necessary to insure a perfect union between the two ends thereof. Next it is customary to place on the first fabric 115 a second layer 116, with the grain or warp thereof crossing the warp of the first layer, whose width is such as to just enter the crease between the outer portion of the core and the flat portion. After this beading is placed in position, as just described, then the lower edges of the first strip of fabric 115 are folded up around the beading and pressed against the inclined sides of the second strip of fabric 116 and caused to adhere thereto by the sticky nature of which it is composed. Then a third strip of fabric 117, of such a width as to extend down to the intersection of the beading with the shell, is placed on said second strip 116, and thereby covers the reflected ends of the first strip. Any preferred or desirable number of strips may be placed thereon, following this operation until the shell has acquired a desired thickness. Over this is placed a coating of rubber with a thickened portion on what will be the tread portion.

The core is removed from the spokes 6 by releasing the clips 7 and is taken to the vulcanizer and after being inclosed in a mold is properly vulcanized, after which the shell is stripped from the core by hand, this being easily accomplished by reason of the elasticity of the shell. The core is then returned to the machine and the process repeated.

What we claim, and desire to secure by Letters Patent, is—

1. The combination in a machine of the class specified of a tension device to simultaneously smooth and flatten strips of fabric, a revoluble core to receive said strips from said device, means to form said strips approximately longitudinally about said core and means to regulate the tension on said feeding device.

2. A machine of the class specified consisting of revoluble means to support the article to be built while in the process of manufacture and means for creasing or stitching portions of said article on said revoluble means.

3. A machine of the class specified involving revoluble means to sustain the article to be made during the construction and means for placing simultaneously suitable strips of beading on both sides of said article while on said revoluble means.

4. A machine of the class specified consisting of revoluble means to sustain the article while in construction, means to regulate the tension of the various parts of the article while being fed onto said revoluble means, means to smooth various portions of said article, means to crease or stitch said article and means to place strips of beading on said article while mounted on said revoluble means.

5. A machine of the class specified involving revoluble means for sustaining the article under construction, means to revolve said sustaining means, said last-named means being arranged to smooth certain portions of said article.

6. The combination in a device of the class specified of a revoluble core to sustain the article under construction, and a friction-roller adapted to transmit motion to said core and simultaneously smooth a certain portion of the article during said revolution.

7. The combination in a device of the class specified of a revoluble core to sustain the article while under construction, frictional means to bear on the article and revolve said core, means to feed material to said core, devices for smoothing material while on said core, and means to regulate the position of said revolving core with relation to said smoothing mechanism.

8. The combination in a device of the class specified of a revoluble core to sustain the article during construction, a carriage adapted to slide toward and away from said core, suitable mechanism mounted on said carriage to place suitable beading on the side of said article during construction of said article.

9. The combination in a device of the class specified, of a revoluble core to sustain the article while under construction, of reciprocating mechanism involving fingers to press and smooth the sides of said article while sustained on said revolving means.

10. The combination in a device of the class specified of a revoluble means to sustain the article while being constructed, of reciprocating means involving smoothing-fingers to work substantially radially to said supporting means and smooth the sides of said article while on said revoluble means, and means to regulate the stroke of said reciprocating means as desired.

11. The combination in a device of the class specified of a revoluble core to sustain the article while under construction, a roller to smooth the outer portion of the article while on said revolving means, said roller being provided with flexible sides, spring-pressed rollers to bear on said flexible sides to smooth a portion of the sides of said article during its revolution.

12. The combination in a machine of the class designated of a revoluble core to sustain the article while being constructed, a slidable carriage arranged to move toward and away from said core, shafts mounted in said carriage bearing eccentrically-pivoted rollers capable of placing a beading on the sides of said article, and means to rock said shafts and throw said rollers toward and away from the article while on said revolving means.

13. The combination in a machine of the class designated of a revoluble core to sustain the article while being constructed, a slidable carriage arranged to move toward and away from said core, shafts mounted in said carriage bearing eccentrically-pivoted rollers capable of placing a beading on the sides of said article, means to rock said shaft and throw said rollers toward and away from the article while on said revolving means, and guides to direct and sustain strips of beading fed to said rollers.

14. The combination in a machine of the class designated of a revoluble core to sustain the article while under construction, a frame capable of being swung toward and away from said article, inwardly-movable arms on said frame, creasing-rollers on said arms and mechanism to force said creasing-rollers against a desired portion of said article while being constructed.

In testimony that we claim the above we hereunto set our hands in the presence of two subscribing witnesses.

FRANK A. SEIBERLING.
WILLIAM C. STEVENS.

In presence of—
C. E. BINGHAM,
GEO. W. ROGERS.